US 8,656,551 B2

(12) United States Patent
Duncan

(10) Patent No.: US 8,656,551 B2
(45) Date of Patent: Feb. 25, 2014

(54) VACUUM CLEANING FILTER BAG

(75) Inventor: Christopher Robert Duncan, Chard (GB)

(73) Assignee: Numatic International Limited, Surrey (GB)

( * ) Notice: Subject to any disclaimer, the term of this patent is extended or adjusted under 35 U.S.C. 154(b) by 186 days.

(21) Appl. No.: 13/124,907

(22) PCT Filed: Oct. 20, 2009

(86) PCT No.: PCT/GB2009/002491
§ 371 (c)(1),
(2), (4) Date: Jul. 21, 2011

(87) PCT Pub. No.: WO2010/046632
PCT Pub. Date: Apr. 29, 2010

(65) Prior Publication Data
US 2011/0265283 A1  Nov. 3, 2011

(30) Foreign Application Priority Data
Oct. 20, 2008 (GB) .................................. 0819209.8

(51) Int. Cl.
*A47L 9/14* (2006.01)
(52) U.S. Cl.
USPC .............................................. 15/347; 15/352
(58) Field of Classification Search
USPC .............. 15/347, 352; 55/382, 485–487, 527, 55/DIG. 2, DIG. 39
See application file for complete search history.

(56) References Cited

U.S. PATENT DOCUMENTS

| | | | |
|---|---|---|---|
| 1,124,574 A | 1/1915 | Zimmer | |
| 2,951,553 A | 9/1960 | Kirby | |
| 3,184,778 A | 5/1965 | Lindberg et al. | |
| 3,320,727 A | 5/1967 | Farley et al. | |

(Continued)

FOREIGN PATENT DOCUMENTS

| | | |
|---|---|---|
| CA | 2609878 | 5/2008 |
| DE | 8506818 | 8/1986 |

(Continued)

OTHER PUBLICATIONS

International Application No. PCT/GB2009/002491, International Search Report mailed Feb. 5, 2010 (3 pages).

(Continued)

*Primary Examiner* — Dung Van Nguyen
(74) *Attorney, Agent, or Firm* — Meunier Carlin & Curfman, LLC

(57) ABSTRACT

The disclosure relates to the field of vacuum cleaning and in particular the collection of air-entrained debris, in a filter bag. The filter bag is for use in vacuum cleaning apparatus, and comprises fine planar filtration means in the form of a collection bag and coarse planar filtration means both being adapted to be placed in a suction-induced air stream with the coarse filtration means disposed upstream of the fine filtration means, wherein the fine filtration means serves to provide a fine filter for retaining dust particles and wherein the coarse filtration means comprises a relatively coarse filter material having a thickness of at least 4 mm which provides a matrix volume in which dust may be collected. The volume occupied by the coarse filtration means comprises at least 2%, preferably at least 5%, most preferably at least 10% of the maximum internal volume defined by the collection bag.

11 Claims, 5 Drawing Sheets

(56) References Cited

U.S. PATENT DOCUMENTS

| | | |
|---|---|---|
| 3,343,199 A | 9/1967 | Nolte |
| 3,959,137 A | 5/1976 | Kirsgalvis |
| 3,961,921 A | 6/1976 | Heiman et al. |
| 4,133,769 A | 1/1979 | Morgan, Jr. |
| 4,185,974 A | 1/1980 | Hiester |
| 4,268,390 A | 5/1981 | Cunningham |
| RE32,788 E | 11/1988 | Disanza, Jr. |
| 4,811,453 A | 3/1989 | Lubraniecki |
| 5,564,155 A | 10/1996 | Monesson |
| 5,681,363 A | 10/1997 | Tucker et al. |
| 5,946,768 A | 9/1999 | Kelly |
| 6,156,086 A * | 12/2000 | Zhang .................. 55/382 |
| 6,183,536 B1 | 2/2001 | Schultink et al. |
| 6,966,939 B2 * | 11/2005 | Rammig et al. ......... 55/486 |
| 8,070,862 B2 * | 12/2011 | Woo et al. ............... 96/69 |
| 2004/0211160 A1 | 10/2004 | Rammig et al. |
| 2005/0132676 A1 | 6/2005 | Nhan et al. |
| 2007/0022565 A1 | 2/2007 | Mayes et al. |
| 2009/0301043 A1 | 12/2009 | Rosemeier et al. |

FOREIGN PATENT DOCUMENTS

| | | |
|---|---|---|
| DE | 4014219 | 11/1990 |
| DE | 200 13 364 U1 | 2/2001 |
| DE | 10 2004 046669 A1 | 3/2006 |
| DE | 20 2006 019108 U1 | 2/2007 |
| DE | 20 2008 007 717 U1 | 8/2008 |
| JP | 56132926 | 10/1981 |
| JP | 62192130 | 8/1987 |
| JP | 02305535 | 12/1990 |
| JP | 09019389 | 1/1997 |
| JP | 2006223431 | 8/2006 |
| WO | 2004/028662 A2 | 4/2004 |
| WO | 2009/032785 A2 | 3/2009 |
| WO | 2010/067053 | 6/2010 |

OTHER PUBLICATIONS

International Application No. PCT/GB2009/002491, International Preliminary Report on Patentability mailed Apr. 26, 2011 (7 pages).

Related U.S. Appl. No. 13/133,169, filed Jun. 24, 2011.

International Report on Patentability and Written Opinion, dated Jun. 14, 2011, received in connection with related International Application No. PCT/GB2009/002831.

International Search Report, dated Mar. 12, 2010, received in connection with related International Application No. PCT/GB2009/002831.

* cited by examiner

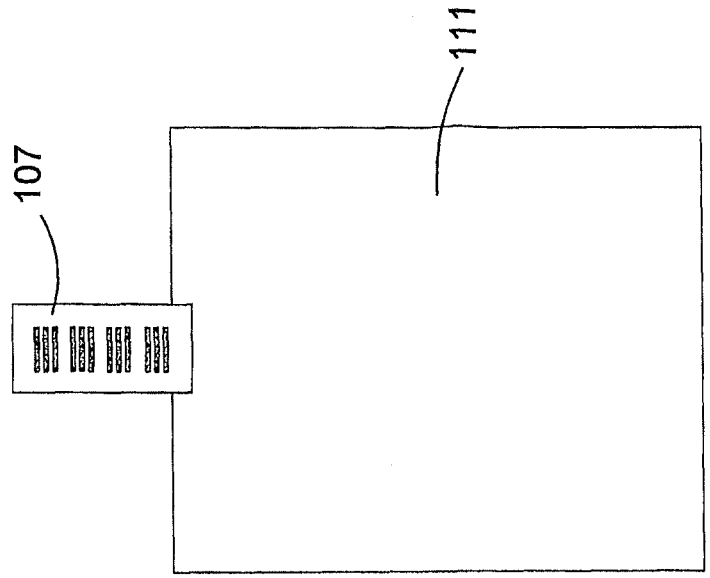
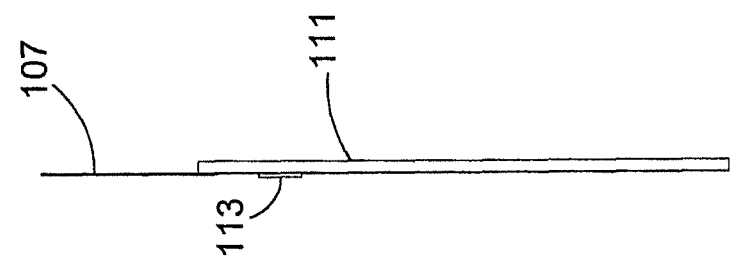
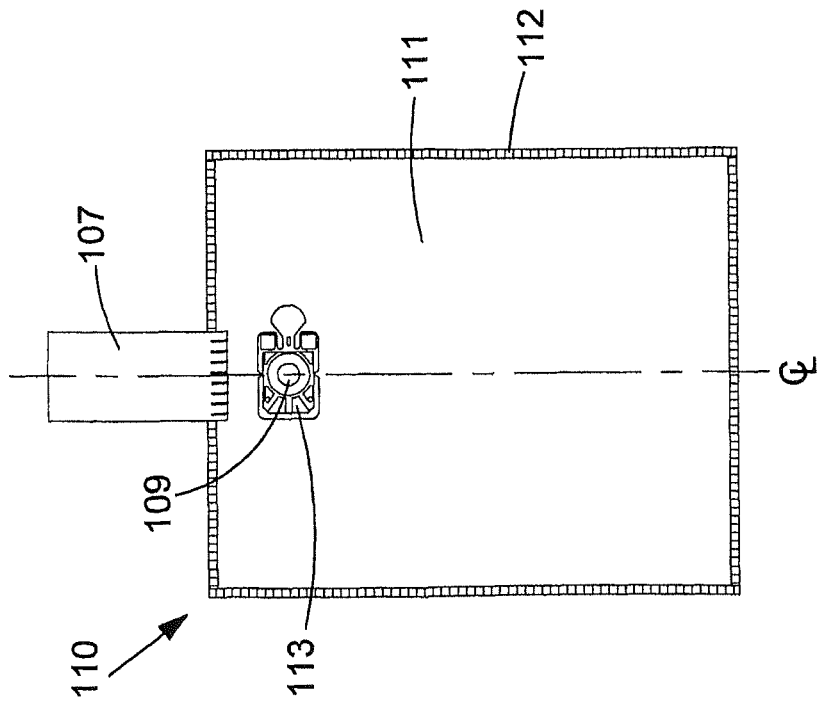
FIG.4C
FIG.4B
FIG.4A

VACUUM CLEANING FILTER BAG

BACKGROUND OF THE INVENTION

The present invention relates to the field of vacuum cleaning and in particular the collection of air-entrained debris, for example in a filter bag.

Domestic and upright type vacuum cleaners are typically equipped with porous paper bags into which dirt-laden air lifted from a floor or carpet is drawn by a vacuum drive. Cyclonic separators are also well known in both a domestic and industrial contexts for separation of air-entrained particles from an air stream.

Industrial and commercial bin-type cleaners frequently avoid using a bag for collection, so as to avoid bag replacement. In this case dirt is drawn from a floor surface into a tubular wand and collected directly in a drum or bin rather than a bag. A filter cup or layer may be used to cover a vacuum drive port typically in an upper end region of the bin. The bag prevents fine particles from leaving the bin during use and fouling the vacuum drive (typically an electric motor and impeller combination.) For wet collection the filter bag may be made from a plastics material or foam, so that filtering performance is not compromised by airborne liquid.

A particular problem exists in the field of vacuum cleaners used in building or construction sites to collect fine brick or plaster dust which is created when these materials are subject to grinding by tools. For example, when channels or tracks are formed in walls or partitions of buildings so as to permit the chasing-in of pipe work or electric cabling or the like into the wall. Large volumes of very fine dust are generated by such processes. So as to avoid contaminating the building interior with dust, vacuum cleaner attachments are provided for the grinding tools so that the dust may be collected. In addition health and safety requirements mean that dust contamination should be minimized. Thus external air recirculation filters may be used in combination with the vacuum cleaners.

One problem which arises in the collection of fine brick or plaster dust is that the upstream internal surfaces of collection bags or filters rapidly become blocked with a surface layer of dust. Even high performance multi-layer collection bags rapidly become saturated with dust which prevents airflow through the bag or filter and therefore markedly reduces the vacuum pressure drop. It has been found that a period of five to ten minutes of suction is all that can be maintained when collecting brick or plaster dust during chasing-in grinding or cutting.

To overcome this, two approaches have been adopted. One is to do without collection bags and use high surface area star-plan filters in the vacuum path next to the drive motor. These filters may be agitated or vibrated so as to displace the caked-on dust. The agitators are not very effective because detached dust particles remain airborne and a thus rapidly drawn back onto the filter surface. A serious problem in bagless cleaners is the emptying of the collection bin. As there is no bag there is a danger that dust will be released into the air when the bin is emptied into a refuse sack or the like.

The second approach is for the operator of the bag vacuum cleaner to deactivate the vacuum cleaner when the suction falls too low. This allows the collection bag to contract and "relax" and allow the dust layer formed on the bag interior surface to flake off. Provided the vacuum is turned of for about a minute, allowing the bag to contract and dust to flake off and fall into the lower end regions of the collection bag, then performance will revert to a reasonable level. Nevertheless performance will once again rapidly decrease when the machine is put back into use.

U.S. Pat. No. 6,183,536 discloses a multilayer vacuum cleaner bag made up of a high permeability relatively coarse layer disposed upstream of a fine grade filter. The coarse layer is intended to capture large dust particles and prevent them from shock loading the fine filter layer. The embodiments disclosed are notable for having a low overall thickness of the multi-layer filter, typically less than 1 mm. Although it is claimed that these filters provide extended life in normal working conditions they are unsuitable for use in construction industry applications in which very large quantities of fine brick or plaster dust are to be collected. They would become rapidly caked in dust several millimeters thick as they are unable to cope with the mass of dust produced.

US 2004/0211160 discloses a multilayer filter structure for removing dust from gases. The filter has a fine layer and a coarse layer, the filters each being made up of fibres which have a diameter gradient, so that filter diameter gradually decreases from intake to outlet sides of the filter.

Gebrauchsmuster DE 20 2008 007 717U1 discloses a filter bag in which an inner compartment serves as a pre-filter which is filled first before the rest of the bag.

SUMMARY OF THE INVENTION

It is an object of the present invention to provide a vacuum cleaner which is capable of collecting fine brick and plaster dust formed by grinding or otherwise machining brick and plaster with extended suction performance so that dust may be collected without interruption or at least for longer periods than current products. In another aspect the invention provides a filter bag for the collection of brick and plaster dust with provides improved suction performance over time in a vacuum cleaner.

According to one aspect of the invention, there is provided a filter for use in vacuum cleaning apparatus, which comprises fine planar filtration means and coarse planar filtration means both being adapted to be placed in a suction-induced air stream with the coarse filtration means disposed upstream of the fine filtration means, wherein the fine filtration means serves to provide a fine filter for retaining dust particles and wherein the coarse filtration means comprises a relatively coarse filter material having a thickness, preferably of at least 4 mm. The coarse filter may provide a matrix volume in which dust may be accumulated so as to prevent early fouling of the fine filter.

It has surprisingly been found that the use of a coarse, thick filter layer or layers upstream of the fine dust filter provides enhanced performance. Specifically the ability to collect significantly more brick/plaster dust before the suction of a vacuum cleaner degrades to the extent that the bag may be replaced. This is unexpected because a coarse filter would not usually be thought to be suitable for collecting fine dust which may in theory travel through the filter unhindered. The depth and tortuous path provided by the coarse layer is thought to allow a large amount of the dust to settle and become immobilised, before reaching he fine filter downstream. This invention is particularly useful for grinding and chasing-in tasks in construction where very large amounts of dust are generated and which tend to quickly swamp known vacuum cleaner filters.

The fine planar filtration means may be a filter web arranged in the form of a collection bag. In this case the upstream filter side adjacent the bag interior, and the downstream filter side is the region the bag outside the upstream filter.

The volume occupied by the coarse filtration means comprises at least 2%, preferably at least 5%, most preferably at least 10% of the maximum internal volume defined by the collection volume (e.g. bag interior).

The coarse filtration means preferably comprises one sheet or more stacked sheets of fibre felt or fleece each having a thickness of at least 4 mm. The stacking may be achieved by the use of multiple discrete layers, or by the folding over of one or more individual elongate sheets. Where a single layer of felt or fleece is used the thickness is at least 4 mm and preferably more than 8 mm.

The coarse filtration means in a preferred arrangement comprises a web of fibre felt folded a plurality of times to produce the stacked structure. The felt may be a melt blown fibre polymer material, of for example polyethylene or polypropylene.

In a particular embodiment, the external surfaces of the stacked or layered felt sheet or web are not adhered either to each other or to the fine filtration means, so that the sheets or web portions may shift or displace relative to neighbouring sheets or web portions, or relative to the fine filtration means.

The coarse filtration means may be attached to the fine filtration means by discrete attachment means, for example by crimping, stitching, gluing or melt bonding at points or along lines. This attachment typically extends along a periphery or edge region of the bag.

In one embodiment the coarse filtration means comprises a plurality of sheets or a folded web of material and edge regions of the sheets or web are not closed, so that air may spill around from one sheet side to the other when the filter is in use.

In another embodiment, the peripheral edge regions of the coarse filter sheets or web are closed, for example by crimping, stitching, gluing or melt bonding at points or along lines. This enhances the collection performance but is more complex to manufacture.

In an arrangement suitable for use in known industrial and domestic vacuum cleaners, the fine planar filtration means may be a filter web arranged in the form of a collection bag. An air port may be formed through the fine filter web so as to permit airflow directly into the bag interior.

In another aspect of the invention there is provided vacuum cleaning apparatus comprising a suction drive motor and a housing adapted to removably mount a filter as hereinbefore described, wherein the filter is mounted in an air path formed by the drive motor so as to permit dust collection on or in the filter.

The cleaner may be provided with a vacuum conduit which communicates with a brick or plaster grinding or cutting tool so as to permit collection of the dust generated by the tool when in use.

Following is a description by way of example only of one mode for putting the present invention into effect.

BRIEF DESCRIPTION OF THE DRAWINGS

In the drawings: —

FIG. 4A is a front view of a bag according to a second embodiment of the invention. FIGS. 4B and 4C are side and back views of the bag.

DETAILED DESCRIPTION OF THE INVENTION

First Embodiment

Figure 1:
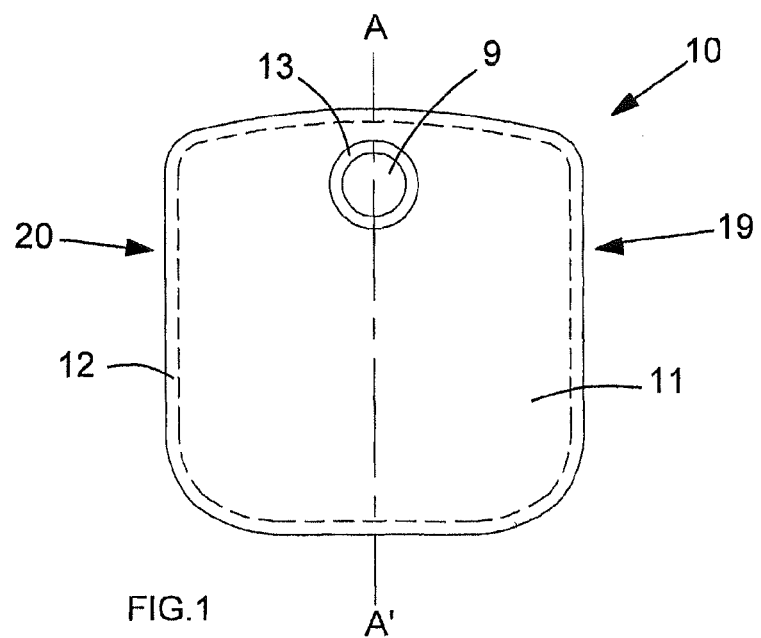
FIG. 1 is a front view of a filter bag according to an embodiment of the invention.

In FIG. 1 a filter bag for an industrial vacuum cleaner is shown generally as 10. An outer membrane 11 of the bag is formed from two generally square sheets of a fine filter web which are overlapped and heat welded to each other along a peripheral seam 12. The bag has a width of about 60 cm and a height of about 70 cm. An upper central region of the bag is formed with a circular air inlet port 9, which is attached to the membrane via an annular collar portion 13.

The fine filter web membrane 11 is a multi-layer microporous filter construction intended to retain fine brick and plaster dust. The web is of known composition and structure, essentially comprising three layers laminated to one another. The inner (upstream) layer comprises a spunbonded polymer scrim layer of about 17 g/m$^2$. The middle (sandwich) layer is a melt blown synthetic felt of about 40 g/m$^2$ formed of polypropylene fibre. The outer (clean side) layer is a spun bonded support and fine filtration layer with a weight of about 40 g/m$^2$. Such three-layer filter membranes per se are well known in the art and are available from commercial suppliers such as Airflo Europe B.V.

Figure 2:
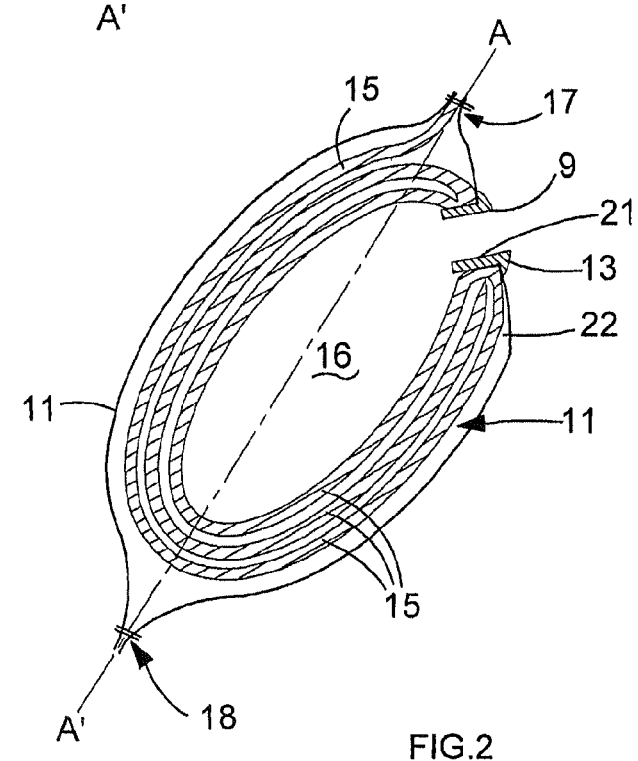
FIG. 2 is a transverse sectional view taken along the line A-A' in FIG. 1.

The internal structure of the bag is shown in FIG. 2. A single sheet of coarse filter web 15 is repeatedly folded to form loosely arranged overlapping filtration layers. As shown in the figures the air path from a centre void 16 in the filter to the membrane would pass three layers of coarse filter web.

The coarse filter web is a melt blown polyester material having a mass of about 80 g/m$^2$ and a thickness of about 8 to 10 mm. The fibres are each about 40 mm long with a diameter of about 0.25 to 0.30 mm. This is a coarser and more permeable construction than would traditionally be used for a dust collection filter. Coincidentally, its characteristics are similar to melt blown polymer fibre filters used in cooker hoods for kitchens.

An upper edge region 17 of the coarse sheet is crimped between outer seams of the outer filter membrane. A lower edge region 18 of the membrane is similarly crimped, but omitting the coarse sheet. The two side regions 19,20 are left uncrimped so that the folded sheet portions are loosely layered and capable of shifting and moving relative to each other. However, the side regions may in an alternative embodiment be attached by crimping so as to obtain optimum suction performance. Even when the edges are crimped, or otherwise attached/immobilised, the layers or sheets can flex to an extent independently of each other. Thus, unlike layered filters membranes which have form a unitary membrane, the relative agitation helps prevent pore blockage an improves dust loading before performance is impaired.

The collar portion 13 of the inlet port has a neck region 21 which feeds into the void 16 so that dust laden air may enter the interior of the filter. The coarse filter web 22 in the region of the neck is crimped and bonded to the collar/neck so as to ensure that the entrance remains open during use.

Figure 3:
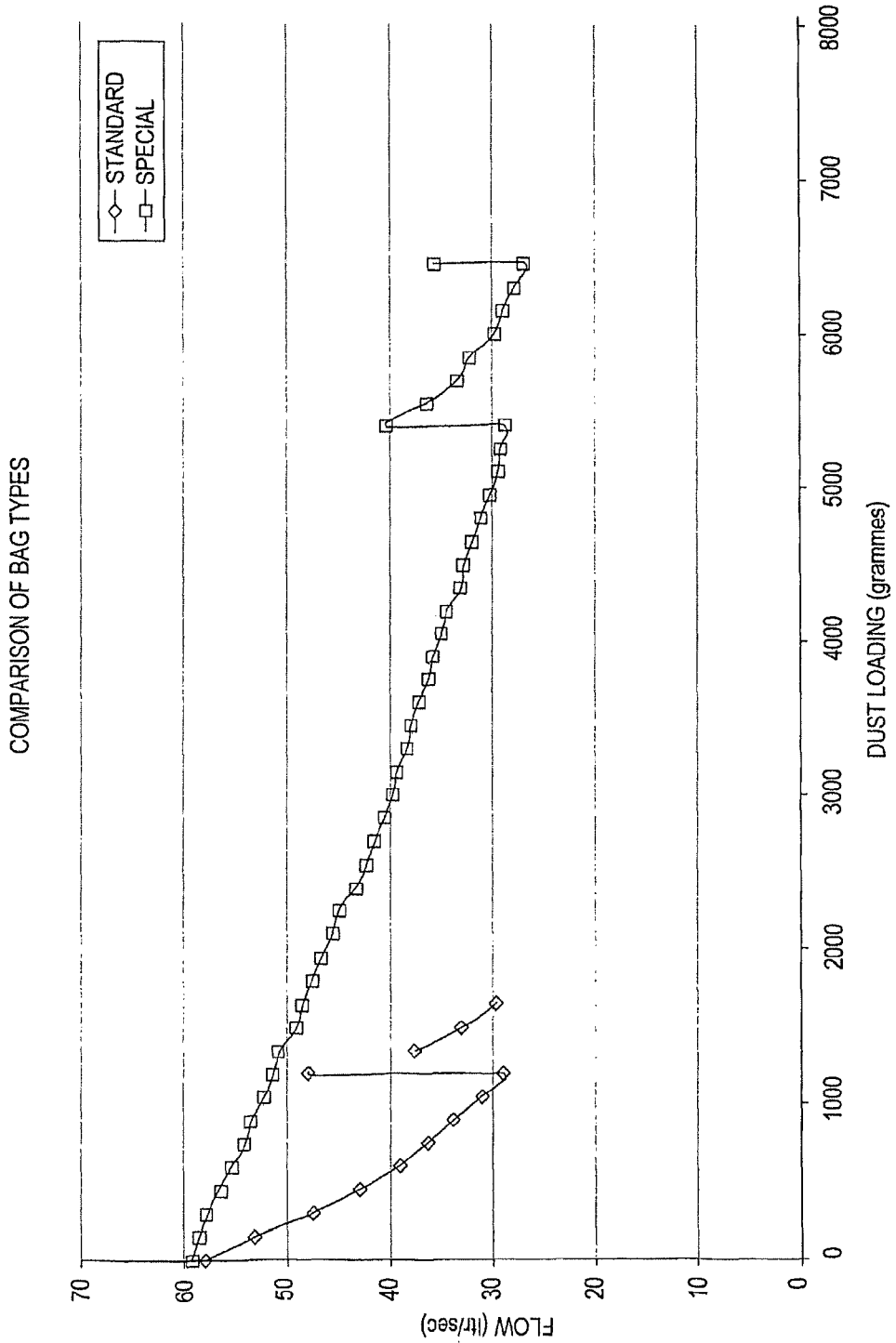
FIG. 3 is a chart showing brick dust collection performance of a prior art fine filter bag compared with the bag of the embodiment of the invention.

In use in a vacuum cleaning machine, it has been found that a filter bag according to the invention provides significant performance enhancements over a bag without the coarse multilayer filter layers upstream of the outer membrane. FIG. 3 shows a graph of air flow rate (Y axis, liters per second) versus dust loading (X-axis, grammes of dust collected in the bag) for two vacuum bags exposed to fine brick dust. Two lines are shown, labelled "standard" (diamonds) and "special" (squares). The standard bag is a simple three layered bag having the constructions as described in the foregoing for membrane 11. The special bag is the invention construction as described above which, unlike the standard bag, also includes the folded coarse melt-spun felt sheet material 15.

The graph shows that for a standard bag, a dust loading of less than 2 kg causes the flow rate to fall by 50%. For the same flow rate drop a bag of the embodiment of the invention will have collected well over 6 kg of brick dust. In practice, it has been found that the user can continuously grind brickwork for about 5 to 10 minutes in a prior art bag before the suction is insufficient to collect further dust to a reasonable standard. By contrast the invention bag may collect continuously for 45 minutes or more.

When the invention bag is inspected it has been found that the brick dust is uniformly distributed through the coarse sheet material, and immobilised therein. This is a surprising and counter-intuitive effect, because a coarse filter of the type used would be expected to offer no significant barrier to fine brisk dust. In fact the coarse filter, and its thickness, serves to provide an open and large surface area upon which the dust can settle before reaching the fine bag membrane. Of course some fine dust does get through and eventually cakes the membrane inner surface, but a considerable amount of fine dust will have been collected on the coarse filter before this happens.

Second Embodiment

Figure 5:
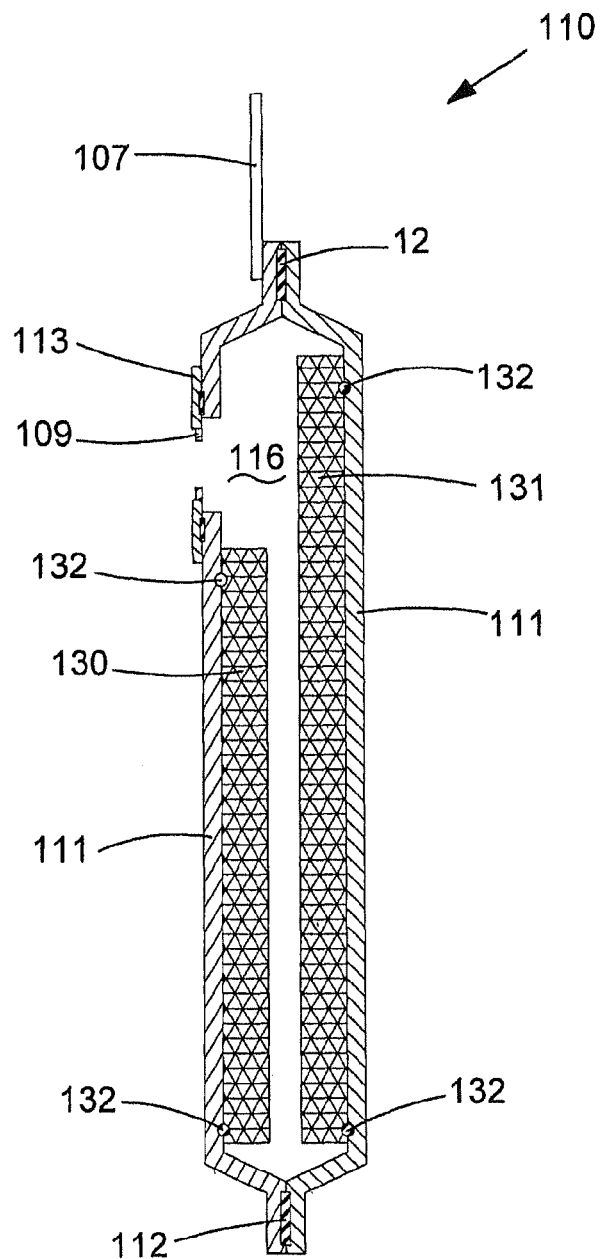
FIG. 5 is a schematic longitudinal cross-sectional view of the bag along the centre line CL marked in FIG. 4A.
Figure 6:
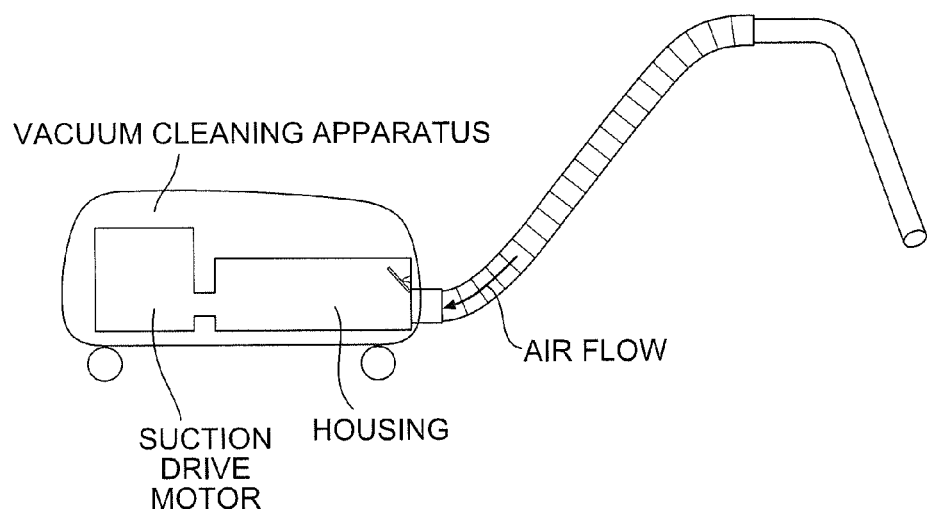
FIG. 6 is a side view of an exemplary vacuum cleaning apparatus showing the suction drive motor, housing, and air flow.

A second embodiment of a vacuum cleaner filter bag is shown as 110 in FIGS. 4A, 4B and 4C and in FIG. 5. An outer membrane 111 of the bag is formed from two generally rectangular sheets of a fine filter web which are overlapped and heat welded (by ultrasound) to each other along a continuous peripheral seam 112 (see also FIG. 5). The bag has a width of about 60 cm and a height of about 72 cm. An upper central region of the bag is formed with a circular air inlet port 109, which is attached to the membrane via a rectangular backing plate 113. A rectangular flexible tongue portion 107 projects upwardly from an upper central edge region of the bag. This tongue may be clamped in the vacuum cleaner (not shown) to position the bag securely.

The fine filter web membrane 111 is a multi-layer microporous filter construction as described in the foregoing in relation to the first embodiment. Such three-layer filter membranes are known in the art and are available from commercial suppliers such as Airflo Europe B.V.

The internal structure of the bag 110 is shown in FIG. 5. Within the bag there is provided a front inner coarse filter sheet 130 and a rear inner coarse filter sheet 131. The inner coarse layers are formed of 220 gsm polyester fleece material having a thickness of about 10 mm. The inner layers are attached to the inside surfaces of the front and rear outside membranes by means of a hot melt adhesive joint 132 at upper and lower outward facing regions of the inner sheet.

The inlet port 109 opens into the interior 116 of the bag so that dust laden air may enter the interior.

The filter bags of the invention provide significantly enhanced fine dust collection capability, particularly for the grinding of brick or plasterwork where large amounts of fine ceramic dust are continuously generated and which tends to foul and degrade conventional filters. Disposal of the bag provides a safe and clean way of removing the collected dust. In a working day, few bags are needed to allow a tradesman to work substantially uninterrupted. The need for secondary recirculation filters is removed and the problem of emptying and cleaning bag-less machines is avoided.

The essence of the present invention is the use of relatively thick and coarse upstream filter layer to provide a matrix for collection of fine dust. This is achieved by filter arrangements as set for the in the claims hereinafter.

The effect is enhanced by the use of multiple layers of coarse filter material and/or by allowing the layers to be loosely held in the bag, rather than laminated intimately to adjacent layers. Thus they may shift relative to one another, at least to a limited extent. This is thought to encourage the uniform distribution of dust through the layers, although this has not been proved.

The invention claimed is:

1. A filter bag for use in vacuum cleaning apparatus, which bag comprises fine planar filtration means comprising a filter web arranged in the form of a collection bag and coarse planar filtration means comprising at least one sheet of fibre felt or web material disposed inside said bag, wherein an inlet port is provided through the fine filter web so as to permit airflow access to the coarse filtration means in the interior of the bag when the bag is placed in the path of a suction-induced air stream, with the coarse filtration means disposed generally upstream of the fine filtration means, wherein the fine filtration means serves to provide a fine filter for retaining dust fine particles and wherein the relatively coarse filter sheet material has a thickness of at least 4 mm thereby to provide a matrix volume in which dust may be collected, and wherein the coarse filtration means comprises a plurality of sheets or a folded web of material, and peripheral edge regions of the sheets or web are not closed, so that air may spill around from one sheet side to the other when the filter is in use.

2. A filter bag as claimed in claim 1 wherein the volume occupied by the coarse filtration means comprises at least 5% of the maximum internal volume defined by the collection bag.

3. A filter bag as claimed in claim 1 wherein the coarse filtration means comprises more than one stacked sheet of fibre felt or web each having a thickness of at least 4 mm.

4. A filter bag as claimed in claim 3 wherein the coarse filtration means comprises a web of fibre felt folded a plurality of times to produce the stacked structure.

5. A filter bag as claimed in claim 3 wherein the external surfaces of the coarse sheet felt or web are not laminated to each other so that the sheets may shift or displace relative to neighbouring sheets or web portions.

6. A filter bag as claimed in claim 1 wherein the external surfaces of the coarse sheet of felt or web are not laminated to the fine filtration means, so that the sheets or web portions may shift or displace relative neighbouring sheets or web portions, or relative to the fine filtration means.

7. A filter bag as claimed in claim 1 wherein said at least one coarse sheet is attached to the fine filtration means by discrete attachment means along a peripheral edge region of the sheets, for example by stitching, crimping, gluing or melt bonding at points or along lines.

8. A filter bag as claimed in claim 1 wherein the coarse filtration means comprises a plurality of sheets or a folded web of material and peripheral edge regions of the sheets or web are closed, but elsewhere the facing portions of the sheets are not attached, so that limited independent movement of one sheet with respect to its neighbour is possible.

9. A filter bag as claimed in claim 1 wherein the volume occupied by the coarse filtration means comprises at least 5% of the maximum internal volume defined by the collection bag.

10. A vacuum cleaning apparatus comprising a suction drive motor and a housing adapted to removably mount a filter bag, wherein the filter is mounted in an air path formed by a drive motor so as to permit dust collection in the bag, which bag comprises fine planar filtration means comprising a filter web arranged in the form of a collection bag and coarse planar filtration means comprising at least one sheet of fibre felt or web material disposed inside said bag, wherein an inlet port is provided through the fine filter web so as to permit direct airflow access to the coarse filtration means in the interior of the bag, whereby the coarse filtration means is disposed generally upstream of the fine filtration means, and the fine filtration means serves to provide a fine filter for retaining dust fine particles and the coarse filter material has a thickness of at least 4 mm and which thereby provides a matrix volume in which dust may be collected, and wherein the coarse filtration means comprises a plurality of sheets or a folded web of material, and peripheral edge regions of the sheets or web are not closed, so that air may spill around from one sheet side to the other when the filter is in use.

11. A vacuum cleaning apparatus as claimed in claim 10 and provided with a vacuum conduit which communicates with a brick or plaster grinding or cutting tool so as to permit collection of the dust generated by the tool when in use.

* * * * *

UNITED STATES PATENT AND TRADEMARK OFFICE
CERTIFICATE OF CORRECTION

| | | |
|---|---|---|
| PATENT NO. | : 8,656,551 B2 | Page 1 of 1 |
| APPLICATION NO. | : 13/124907 | |
| DATED | : February 25, 2014 | |
| INVENTOR(S) | : Duncan | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 263 days.

Signed and Sealed this
Twenty-first Day of July, 2015

Michelle K. Lee
*Director of the United States Patent and Trademark Office*